United States Patent [19]

Suzuki et al.

[11] Patent Number: 5,173,825
[45] Date of Patent: Dec. 22, 1992

[54] MAGNETIC HEAD USING MAGNETIC OXIDE PART AND MAGNETIC METAL FILM

[75] Inventors: Takashi Suzuki; Takeshi Sawada; Toshio Yamanaka, all of Kanagawa; Tsuyoshi Orikasa, Saitama; Hiroyuki Suzuki, Kanagawa; Makoto Kameyama, Chiba; Kiyozumi Niizuma, Saitama, all of Japan

[73] Assignee: Canon Kabushiki Kaisha, Tokyo, Japan

[21] Appl. No.: 108,809

[22] Filed: Oct. 14, 1987

[30] Foreign Application Priority Data

Oct. 15, 1986 [JP] Japan .............................. 61-246044
May 13, 1987 [JP] Japan .............................. 62-117445
May 14, 1987 [JP] Japan .............................. 62-117602
May 15, 1987 [JP] Japan .............................. 62-119304

[51] Int. Cl.$^5$ ........................ G11B 5/147; G11B 5/23
[52] U.S. Cl. .................................... 360/126; 360/119; 360/122
[58] Field of Search ............... 360/126, 119, 122, 125; 29/603

[56] References Cited

U.S. PATENT DOCUMENTS 4,636,901  1/1987  Ohura et al. ......................... 360/125
4,796,133  1/1989  Kuriyama ........................... 360/119

FOREIGN PATENT DOCUMENTS 0222006  2/1986  Japan .................................. 360/125
0074109  4/1986  Japan .................................. 360/125

Primary Examiner—David J. Severin
Attorney, Agent, or Firm—Robin, Blecker, Daley & Driscoll

[57] ABSTRACT

A magnetic head has a magnetic core comprising a first half core on which a thin magnetic metal film is deposited and a second half core which is opposed to the first half core across a magnetic gap. The film thickness of the thin magnetic metal film of the first half core continuously varies at about a constant rate within a portion thereof adjacent to the effective portion of the magnetic gap.

12 Claims, 23 Drawing Sheets

MAGNETIC HEAD USING MAGNETIC OXIDE PART AND MAGNETIC METAL FILM

BACKGROUND OF THE INVENTION

1. Field of the Invention

This invention relates to a magnetic head and more particularly to a magnetic head called MIG (metal in gap) head which is manufactured by depositing a thin magnetic metal film on a magnetic oxide material and by arranging the thin magnetic metal film in the neighborhood of a magnetic gap.

2. Description of the Related Art

A head of the kind called MIG head which is capable of recording or reproducing on or from a magnetic recording medium of high coercive force such as a tape to which a metal is applied or a metal deposited tape has recently come to be employed. In the case of the MIG head, the most part of the core thereof is made of a high permeability material such as ferrite while the fore end part of the magnetic pole near to the gap part of the head is formed with a thin magnetic alloy film of high saturation flux density such as a permalloy, Sendust or amorphous alloy material.

FIGS. 1(A) and 1(B) show in a most simplified form a portion of the MIG head around an electro-magnetic conversion part thereof. A high permeability chip 301 is made of a single crystal ferrite material or the like. A magnetic alloy film 302 is made of an alloy of high saturation flux density such as Sendust or the like. A magnetic gap part 303 is formed by a non-magnetic material. FIG. 1(A) shows the MIG head of the type which has no magnetic alloy film 302 applied to the inside of a groove provided for a winding. FIG. 1(B) shows another type which has the inside of the winding groove coated also with the magnetic alloy film 302. In the case of FIGS. 1(A) and 1(B), a boundary between the high permeability chip 301 and the magnetic alloy film 302 is arranged to be in parallel to a face which slides over the surface of the magnetic recording medium. (Hereinafter this arrangement is referred to as P type.) Meanwhile, the MIG head includes another type which has the above stated boundary arranged to be not in parallel with the magnetic gap part but to have an azimuth angle relative to the latter. (Hereinafter that arrangement is referred to as A type.)

For example, an example of the MIG head of the P type is disclosed in Japanese Patent Application Laid-Open No. SHO 51-140708. An example of the MIG head of the A type is disclosed in Japanese Patent Application Laid-Open No. SHO 60-32107. In the case of the MIG head of the P type, there is a discontinuity in the magnetic property of the head at the boundary between the magnetic alloy film and the high permeability chip which is in parallel to the magnetic gap part. This discontinuity brings about a phenomenon called a contour effect. In other words, there appears a ripple of about 3 to 4 dB or more in a frequency pair output characteristic curve as shown in FIG. 2. This shortcoming has prevented the P type MIG head from being employed for recording or reproducing head. The A type MIG head has been contrived to avoid the above stated phenomenon and has been put to use for VTRs in a manner as disclosed in the above stated Japanese Patent Application Laid-Open No. SHO 60-32107.

The present applicant has previously filed U.S. patent application Ser. No. 900,881 disclosing a magnetic head which obviates the necessity of joining two half cores of an MIG head to each other with varied modes of embodiment thereof. The same applicant also has filed U.S. patent application Ser. No. 917,152 disclosing with varied modes of embodiments a magnetic head characterized by advantageous arrangement of faces on which a magnetic metal film is to be deposited in an MIG head.

Generally, the structural arrangement of the A type MIG head is more complex than that of the P type MIG head and thus has necessitated a greater number of manufacturing processes which results in a higher cost.

Further, in cases where the A type MIG head is to be manufactured to have a wide track width measuring, say, 60 μm, the head necessitates, depending on its structural arrangement and the manufacturing method employed, a process of forming a magnetic alloy film of thickness about 40 μm by some physical depdsiting method such as sputtering. However, a long period of several hours is necessary just for forming the film in such a thickness by sputtering. Moreover, after the formation of the film, accumulated internal stress would cause cracks not only in the film but also in the ferrite base plate thereof. In some extreme case, the base plate might be broken. Therefore, under the severe conditions of manufacturing processes such as a machining process, a glass welding process to be carried out at a high temperature of 500° to 600° C., etc., the head often fails to be finished in a perfect state. The yield rate of the manufacture thus tends to lower.

SUMMARY OF THE INVENTION

In the light of the above stated problems of the prior art, an object of this invention is to provide a magnetic head which has a good electro-magnetic conversion characteristic and permits the manufacture thereof through simple processes and at a low cost.

Under this object, a magnetic head arranged according to this invention as an embodiment thereof comprises: a first half core including a magnetic oxide material part and a thin magnetic metal film deposited on the magnetic oxide material part; a non-magnetic layer which is arranged to be in contact with the thin magnetic metal film and to have a part thereof serve as a magnetic gap; and a second half core opposed to the first half core through the non-magnetic layer, the thickness of the thin magnetic metal film being arranged to continuously vary at about a constant rate at a part of the non-magnetic layer which is arranged to act as an effective magnetic gap.

Another object of this invention is to provide a magnetic head which permits the manufacture thereof through simple processes without requiring a process of joining half core parts to each other and yet has a good electro-magnetic conversion characteristic.

Under that object, a magnetic head arranged as another embodiment of this invention comprises: a magnetic oxide block; a first thin magnetic metal film accumulated on the magnetic oxide block; a non-magnetic film which is accumulated on the first thin magnetic metal film and has a part thereof arranged to act as a magnetic gap, the first thin magnetic metal film which is in contact with the part of the non-magnetic film acting as the magnetic gap being accumulated on a slanting face of the magnetic oxide block which is slanting to the non-magnetic film; and a second thin magnetic metal film which is formed by accumulating a metal material on the surface of the non-magnetic film.

The above and other objects and features of the invention will become apparent from the following detailed description of embodiments thereof taken in connection with the accompanying drawings.

DETAILED DESCRIPTION OF THE PREFERRED EMBODIMENTS

Figure 1A:
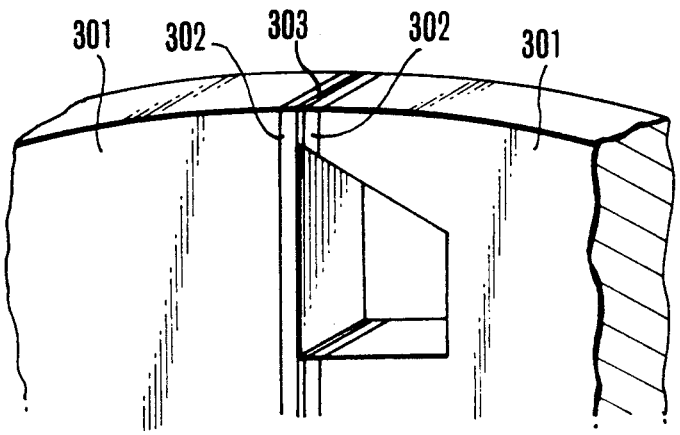
FIGS. 1(A) and 1(B) show examples of arrangement made around the electro-magnetic conversion part of the conventional magnetic heads.
Figure 1B:
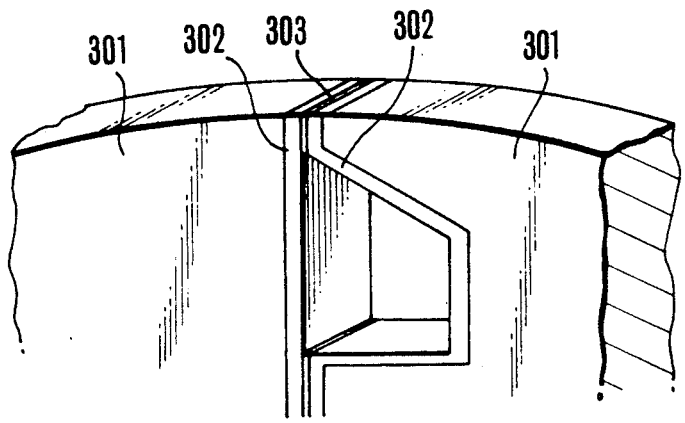
Figure 2:
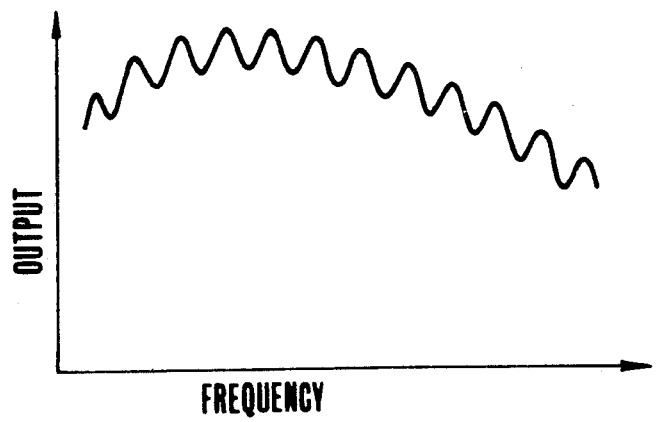
FIG. 2 is a graph showing the electro-magnetic conversion characteristic of the magnetic heads arranged as shown in FIGS. 1(A) and 1(B).
Figure 3A:
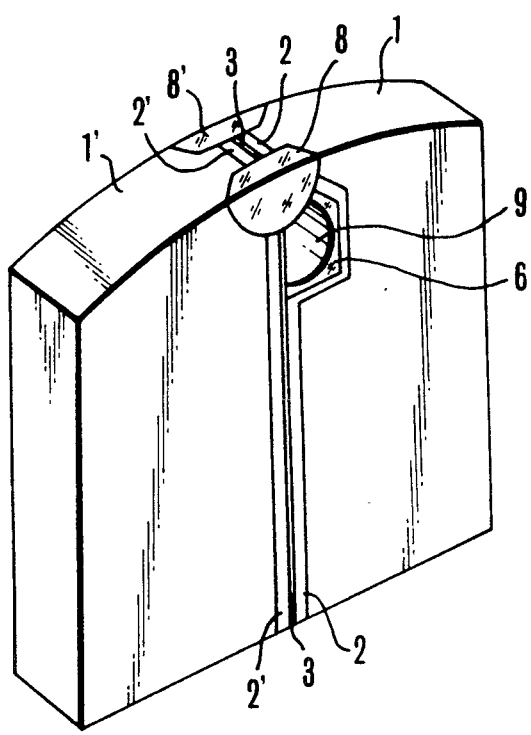
FIGS. 3(A) and 3(B) show the structural arrangement of a magnetic head arranged according to this invention as an embodiment thereof.

A most typical example of embodiment of this invention is described with reference to FIGS. 3(A) and 3(B) and the manufacturing processes for the same embodiment with reference to FIGS. 4(A) to 4(E) as follows:

FIG. 3(A) is an oblique view showing the appearance of a magnetic head which is arranged as an embodiment of this invention. The illustration includes ferrite blocks 1 and 1'; magnetic alloy films 2 and 2'; a magnetic gap part 3; glass parts 6, 8 and 8' which are of a low fusing point; and a winding window 9. The details of parts around the electro-magnetic conversion part of the magnetic head of FIG. 3(A) are arranged as shown in FIG. 3(B), which is a sectional view of the magnetic head taken in the sliding direction of a recording medium.

Figure 3B:
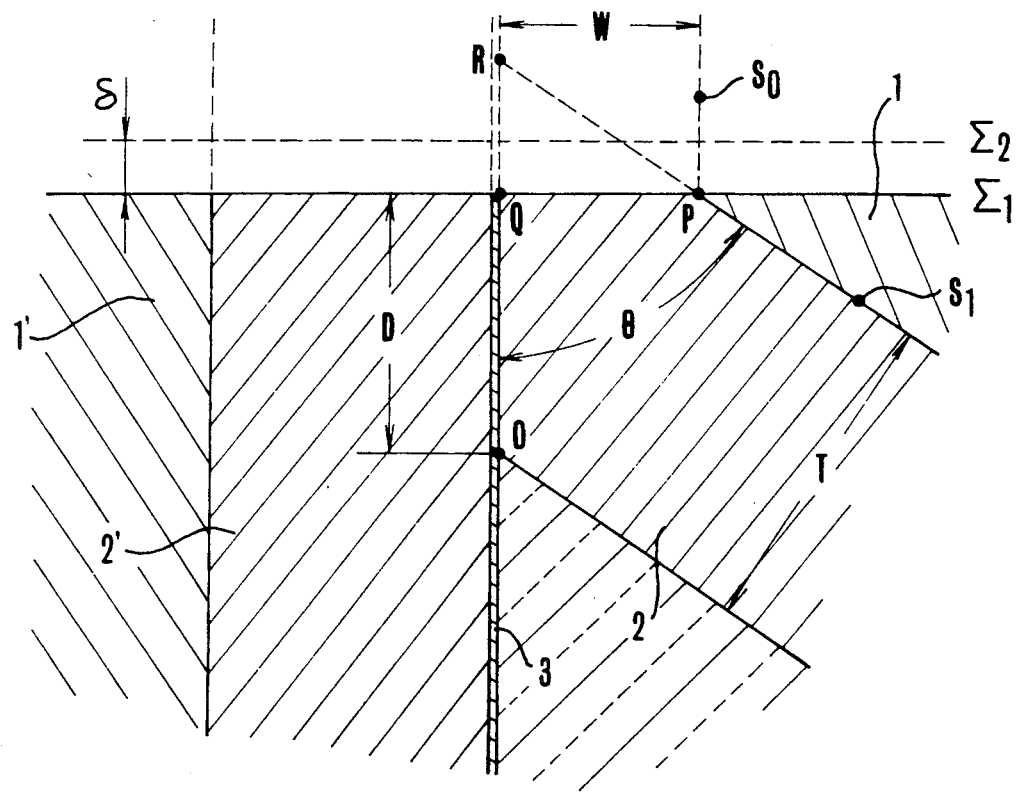

FIG. 3(B) shows the magnetic head of this embodiment showing the basic structural arrangement of the P type as viewed from the side of the sliding face thereof. However, a boundary face between a high permeability material and a high saturation flux density material is arranged aslant at a given acute angle, preferably 30 to 60 degrees, to the face of the gap at least within a range corresponding to the depth of the gap. The arrangement is such that the thickness of the film continuously varies.

This simple arrangement serves to limit the ripple due to the contour effect to a value not exceeding 1 dB. The head has a sufficiently acceptable electromagnetic conversion characteristic as a video head and also permits reduction in cost.

Referring to FIGS. 4(A) to 4(E), the magnetic head of this embodiment is manufactured in the following manner: A rectangular box shaped block 1 is made of single crystal ferrite. On one side of the ferrite block 1 is formed a groove 4 for a winding window. The groove 4 has three wall faces S1, S2 and S3. A magnetic alloy film 2 which is of high saturation flux density and is made of Sendust, an amorphous alloy, permalloy or the like is applied to the side face of the block 1 including the wall faces forming the groove 4. The magnetic alloy film is formed by a physical or chemical process such as sputtering, vapor deposition, plasma CVD (chemical vapor deposition) or the like. In forming the film by the sputtering process, for example, it is preferable that the film is applied to the ferrite block 1 obliquely from below as shown by an arrow in such a manner that, among the three wall faces S1, S2 and S3 forming the groove 4 for the winding window, the wall face S1 which is slanting and is close to the sliding face has a thicker film portion than others. In case that a gap depth measuring about 25 $\mu$m in depth is required as in the case of an 8 mm VTR, the magnetic alloy film is applied to this slanting face S1 to a thickness of about 20 to 25 $\mu$m.

Figure 4A:
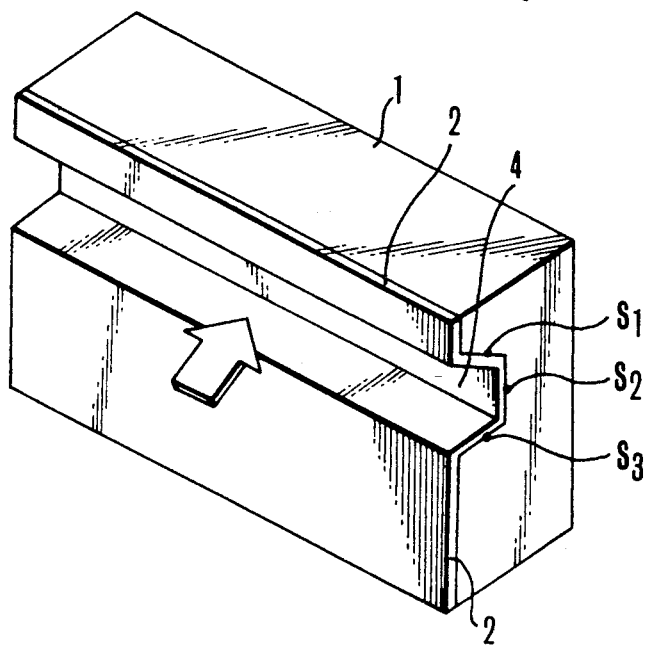
FIGS. 4(A), to 4(E) are the manufacturing process of the magnetic head shown in FIGS. 3(A) and 3(B).
Figure 4B:
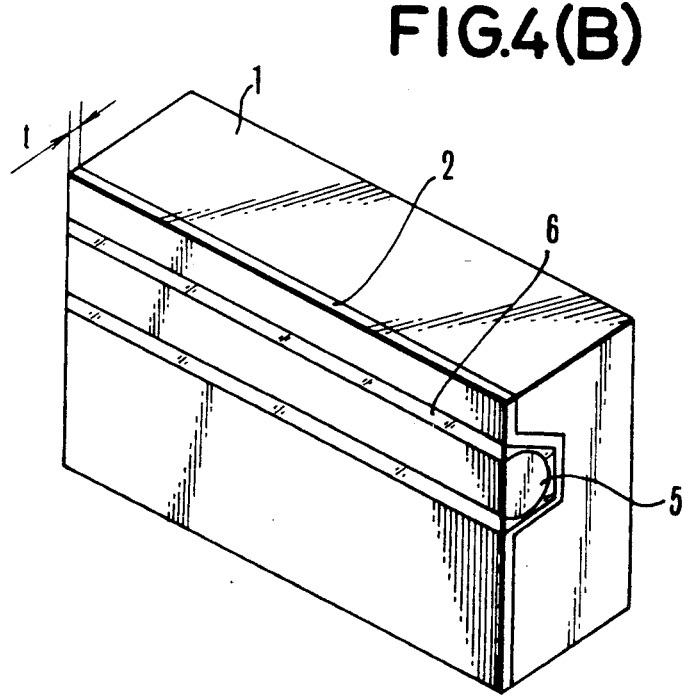

After the film is formed, a metal bar 5 which is made of aluminum or the like is placed into the winding window groove 4 as shown in FIG. 4(B). The metal bar 5 is then buried in the groove 4 by filling the groove 4 with the first glass part 6 which has its fusing point at about 550° C. Then, a butting face is formed by polishing and lapping.

Figure 4C:
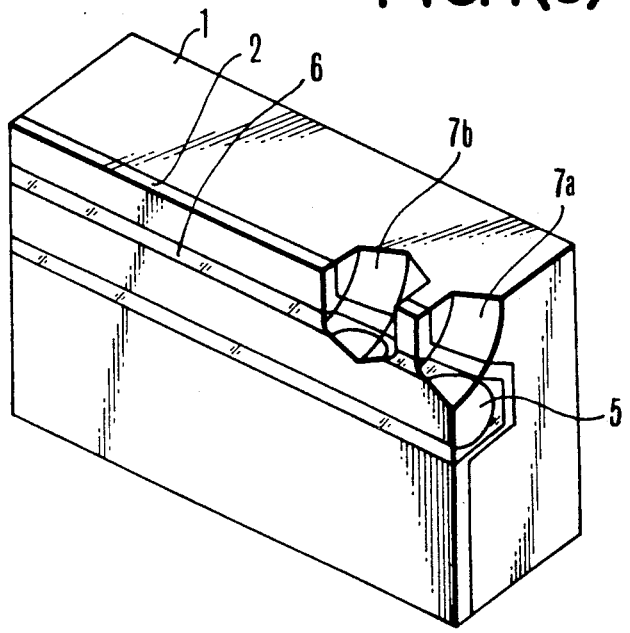

Next, as shown in FIG. 4(C), many flutes 7a, 7b,—are formed in parallel to each other and a machining process is performed to obtain a track width. FIG. 4(C) shows these fluted parts as under a fluting process. With these fluted parts all formed, burrs or the like are which result from the fluting process are removed as necessary by lightly lapping the butting faces. After that, a nonmagnetic gap material such as $SiO_2$, $CrO_2$, or the like is applied by sputtering to a desired thickness of, for example, about 0.2 $\mu$m. All the processes to be performed on the block, which is one half core, before a butting process are completed by this sputtering process. Then, the other half core block which is not provided with any winding window groove has a face corresponding to the butting face. To that face is also applied a magnetic alloy film to a thickness of at least 10 $\mu$m and preferably 20 $\mu$m. The other half core block is also has fluted parts formed on the side of the face corresponding to the butting face and are machined to have the track width.

Figure 4D:
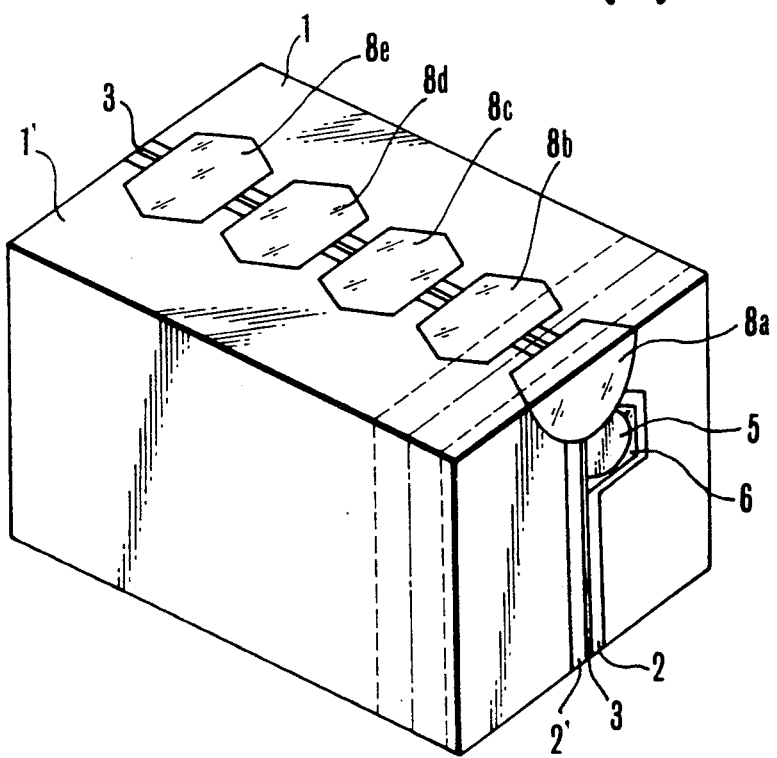
Figure 4E:
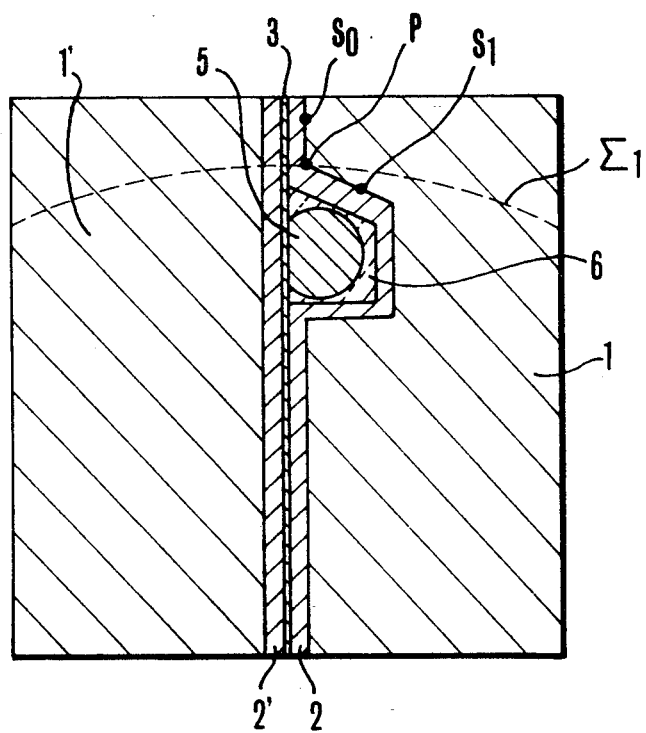

FIG. 4(D) shows a block obtained by butting these two half core blocks and by welding them together by means of second glass parts 8a, 8b, —which are either of the same fusing point as that of the first glass part 6 or of a fusing point a little lower than the first glass part by utilizing among others the fluted parts which are processed to have the track width. Referring to FIG. 4(D), the illustration includes a magnetic gap 3; the above stated second low-fusing-point glass parts 8a, 8b, —. Head chips are obtained by cutting this block at parts as indicated by broken lines. FIG. 4(E) is a sectional view taken along a one-dot-chain line of FIG. 3(D) which passes through the center of the gap part 3 and defines a section perpendicular to the gap face. Referring to FIG. 4(E), the ferrite core block 1 is provided with a groove face S1 for the winding window and a face S0 opposite to the butting face. An intersection line between these two faces S0 and S1 is indicated by a point P. In the case of this specific embodiment, the head is machined to have the position of a sliding face Σ1 is located, in the initial state of the head, at the same position as the point P or somewhat below the point P. The details of a part around the point P of FIG. 4(E) and the gap are as shown in an enlarged view in FIG. 3(B).

Referring again to FIG. 3(B), as briefly stated in the foregoing, the sliding face of the half core body having the winding window forming groove is located above the intersection point P at which the slanting face S1 of the groove for the winding window intersects the face S0 which is in parallel with the gap face. If the face S0 which is in parallel with the gap face remain within the depth range of the gap, the contour effect would show up. The contour effect can be suppressed with the face S0 located on the same plane as the sliding face Σ1 or lower than that. If the face S0 remains within the depth range of the gap, a magnetic flux within the ferrite almost perpendicularly intersects the face S0. In that event, it seems that the boundary face S0 which is in parallel to the gap between two materials of different magnetic properties comes to act like a dummy gap.

Assuming that, in FIG. 3(B), the thickness of the magnetic alloy film 2 applied to the face S1 is T; an angle between the film 2 and the gap face is $\theta$; a distance from the sliding face Σ1 to an end point O in the direction of the gap depth, i.e. the end of the gap depth, with the sliding face Σ1 assumed to pass through just the point P, is D; and a distance from the gap to the point P, i.e. the width $\overline{QP}$ of the magnetic alloy film 2 appearing on the sliding face Σ1, is W, the thickness T is in the following relation to W, D and Q:

$$T = W \cos\theta + D \sin\theta \quad (1)$$

In the case that the head is to be used for recording or reproducing a video signal, let us assume that the gap depth D is set at 25 μm; the angle $\theta$ between the slanting face S1 and the gap face is set at 45 degrees or 60 degrees. Then, with the width W of the film surface on the sliding face Σ1 assumed to be set at varied values 0 μm, 10 μm and 20 μm respectively, the values of necessary thickness T of the film on the slanting face S1 as obtained from Formula (1) above are as shown in Table 1 below:

TABLE 1

| D | 25 μm | | | | | |
|---|---|---|---|---|---|---|
| Θ | 45° | | | 60° | | |
| W | 0 μm | 10 μm | 20 μm | 0 μm | 10 μm | 20 μm |
| T | 17.7 μm | 24.8 μm | 31.8 μm | 21.7 μm | 26.7 μm | 31,7 μm |

The head has been experimentally prepared in varied shapes to find: The output of the head increases with the film thickness T while the contour effect lessens according as the film width W increases. The ripple due to the contour effect becomes less than 1 dB at the film width of about 10 μm. Further, the internal stress increases according as the film thickness T increases. With the film thickness T increased, therefore, cracks or peeling off of the film arise in various parts of the head during a machining process thus to result in a lower rate of yield. It is therefore preferable to have a thin film. Accordingly, referring to Table 1 above, in case that the film width W is less than 10 μm, the angle $\theta$ is preferably set at 45 degrees. Further, in the event of a large head width, it suffices to set the depth D at 10 μm. Therefore, in that event, the film thickness T may be set at about 15 μm with the film width W set at 10 μm.

In the actual manufacturing processes, it is difficult to have the sliding face pass exactly through the intersection line (or the point P) between the faces S0 and S1. It is inevitable to have an error of several μm. In that event, however, there is no problem if the initial sliding face deviates from the face Σ1 downward in the direction of lessening the gap depth D. In case that the sliding face deviates upward as much as δ to be located at Σ2 on the other hand, if the deviating degree δ does not exceed 2 or 3 μm, i.e. if the remaining part of the face S0 is less than 2 or 3 μm depthwise, the ripple due to the contour effect is less than 2 dB, which has been found to produce any adverse effect on the video signal recording and reproduction. Therefore, in an actual application, a machining error having the face S0 remaining several μm in the direction of the gap depth should be considered allowable.

FIG. 3(A) shows in an oblique view the appearance of the head chip obtained by the manufacturing processes described in the foregoing. After a machining process on the sliding face, the head chip is soaked in an alkali solution. Then, the aluminum bar 5 is melted to form the winding window 9.

Figure 5A:
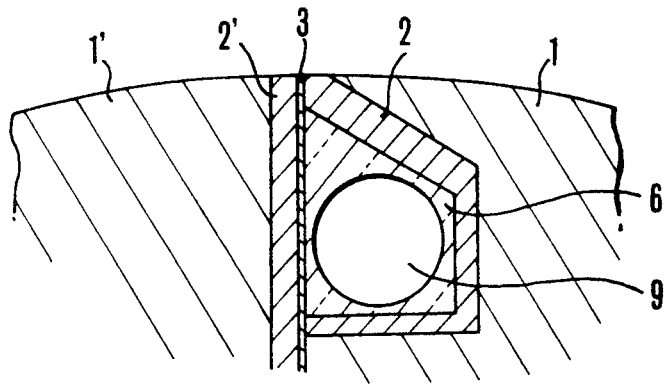
FIGS. 5(A) to 5(F) show examples of modification of structural arrangement of the magnetic head shown in FIGS. 3(A) and 3(B).

FIGS. 5(A) to 5(F) show modification examples of the arrangement around the electro-magnetic conversion part of the magnetic head of FIG. 3(A). In the case of FIG. 5(A), the head is manufactured as follows: The magnetic alloy film 2 of thickness "t" remaining on the butting face of the ferrite block 1 of FIG. 4(B) is further polished and lapped until the ferrite face shows up from beneath. Then, the other half ferrite core block 1' which has no winding window as shown in FIG. 4(D) is butted and the two half ferrite core blocks 1 and 1' are welded together. A head is then obtained through the same processes as described in the foregoing. In this case, the boundary face S1 between the magnetic alloy film and the ferrite block shown in FIG. 3(B) is a single plane extending upward to intersect the gap face at a point R. A relation similar to Formula (1) shown in the foregoing obtains between the width $\overline{PQ}$=W of the magnetic alloy film 2 appearing on the sliding face Σ1 and the values $\theta$, D and T.

Figure 5B:
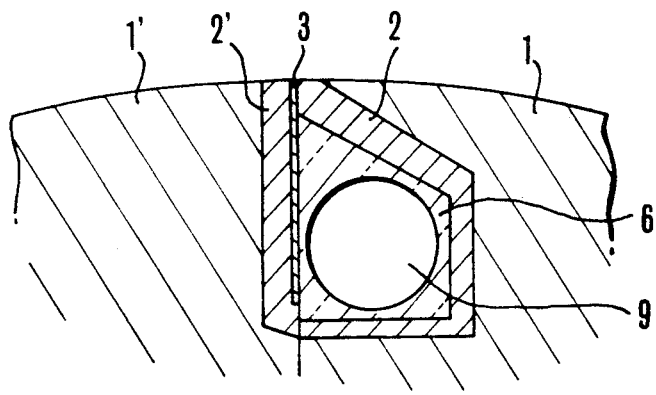

The head of FIG. 5(B) is arranged to have the same half core block that has the winding window as the one shown in FIG. 5(A). As for the other half core block which is to be butted on the first half core block 1 has no magnetic alloy film applied to the lower core side thereof. Further, the lower part of the core is arranged to be coated with no gap material. With the magnetic head arranged in this manner, two magnetic alloy film parts are opposed to each other at the butting faces and continuously surround the winding window to minimize a magnetic reluctance.

Figure 5C:
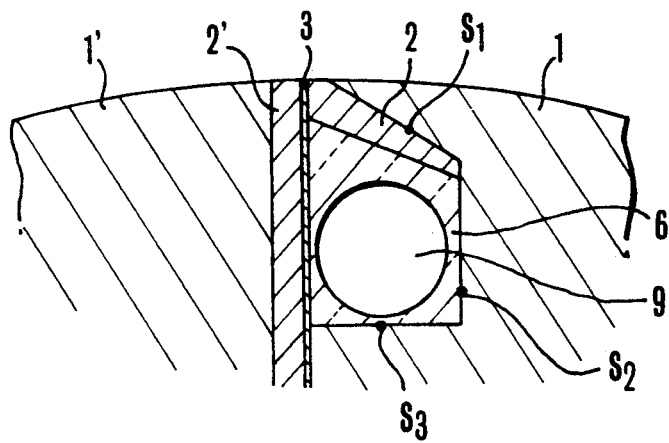

The head of FIG. 5(C) is arranged to have the magnetic alloy film applied only to the slanting face S1 which, among the three wall faces S1, S2 and S3 of the winding window forming groove, is arranged to intersect the gap face at an acute angle. Further, although it applies also to other embodiments, the film thickness on the slanting face S1 may be arranged to decrease and taper down in the direction of the depth of the groove as long as it is sufficiently thick in the vicinity of the gap. The internal stress decreases and the manufacturing yield increases according as the area and the thickness of the magnetic alloy coating film on the ferrite block decrease.

Figure 5D:
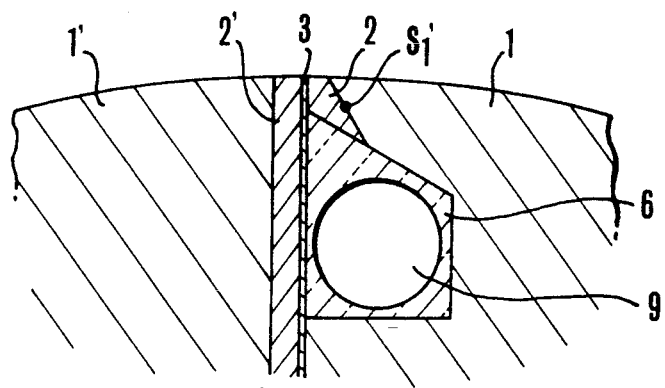

In the case of FIG. 5(D), the head is prepared as follows: Before the winding window forming groove is carved, another groove having a slanting face S1' in parallel to the groove is carved. Then, the magnetic alloy coating film is applied to the surface thereof before the winding window forming groove is carved. The yield of machining processes increases, because a boundary area between two different magnetic materials decreases in this case.

Figure 5E:
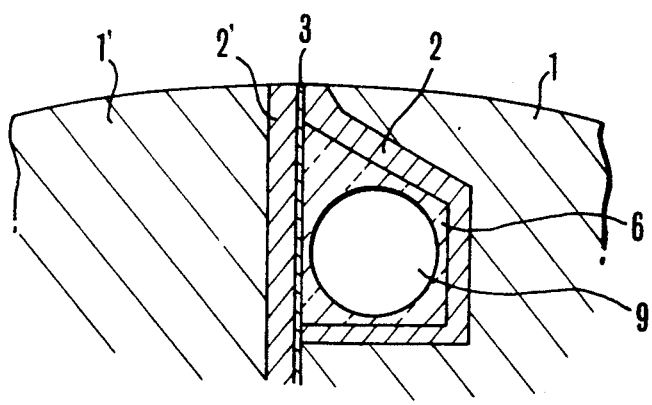

The head of FIG. 5(E) is obtained by forming one slanting wall face of the winding window forming groove into a shape bending halfway and by coating it with the magnetic alloy film. In this case also, the faces coated with the magnetic alloy film are arranged to be on a single plane within the depth of the gap as shown in FIG. 5(E).

Figure 5F:
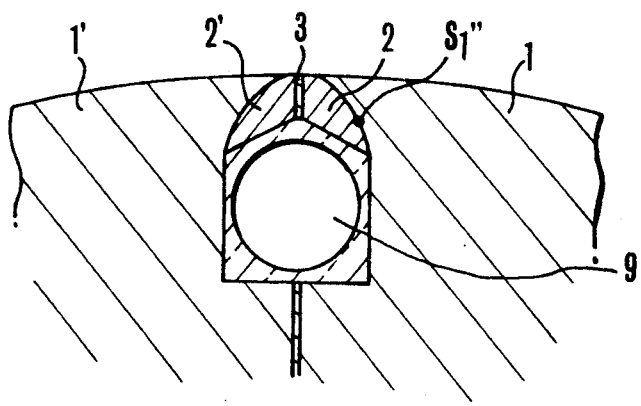

In the case of FIG. 5(F), the head is formed by forming winding window forming grooves in both of two half-core blocks which are butted against each other. The slanting wall faces S1" of the groove are coated with the magnetic alloy film. This arrangement of the head enhances the electro-magnetic conversion efficiency of the head by shortening the length of the whole magnetic path. A boundary face S1" between the magnetic alloy film 2 and the ferrite block 1 is in a curved shape. The tangent plane at every point on the curved face within the gap depth range forms an acute angle with the gap plane. The curvature of the curved face shown may be of the opposite sign.

In every one of the embodiments described, the magnetic head has the thickness of the magnetic alloy film which is applied at least one of the half core parts arranged to vary at about a fixed rate within the depth range of the operating gap according as the depthwise distance from the medium sliding face of the magnetic head increases. This arrangement ensures that the faces coated with the magnetic alloy film are almost on a single plane. This arrangement not only simplifies the machining processes but also prevents the electro-magnetic conversion characteristic from being affected by the contour effect.

Further, in a preferred mode of embodiment of this invention, the distance between the magnetic alloy film coated face and the magnetic gap is arranged to decrease according as the gap is closer to the medium sliding face. In other words, the thickness of the magnetic alloy film is arranged to decrease according as it is closer to the medium sliding face as in the cases of the embodiments described. This arrangement further smoothens the flow of the magnetic flux and thus efficiently prevents the electro-magnetic conversion characteristic from being affected by the contour effect.

Further, the manufacturing processes can be further simplified with the slanting face of the winding window forming groove arranged to serve as a face coated with the magnetic alloy film as in the cases of FIGS. 5(A), 5(B) and 5(C). Further, with the face which is in parallel to the magnetic gap arranged to be coated with the magnetic alloy film of unvarying thickness permits selection of the track width irrespectively of the thickness of the alloy film. That arrangement, therefore, enables a head having a large track width to be manufactured at a low cost.

Figure 6:
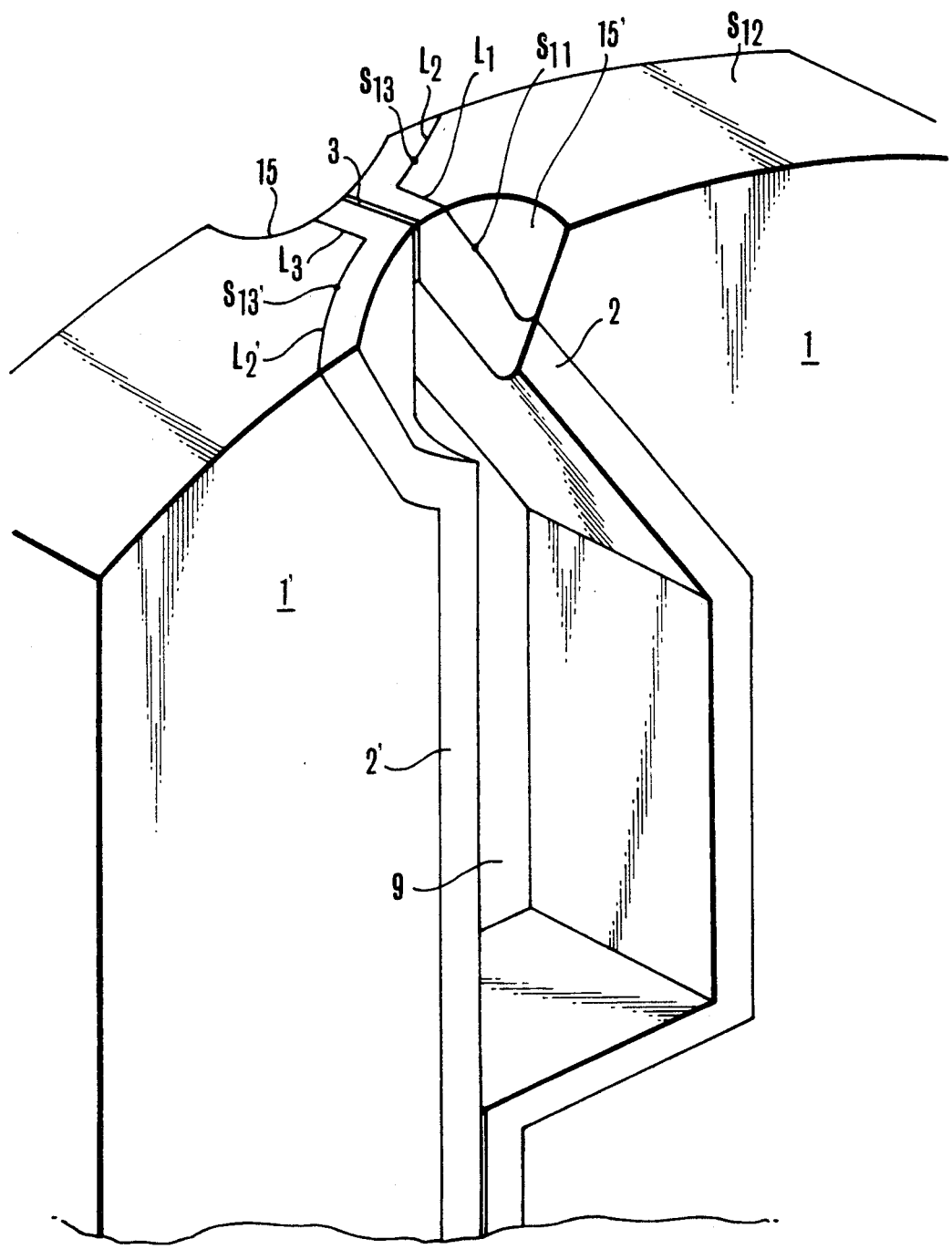
FIG. 6 shows the structural arrangement around the electro-magnetic conversion part of the magnetic head arranged as another embodiment of this invention.

Next, an embodiment of this invention which is arranged to be capable of adequately recording even on such a magnetic recording medium that has an extremely high coercive force is described as follows: FIG. 6 shows the arrangement around the magnetic gap of a magnetic head arranged as another embodiment of this invention. The parts of the head similar to those shown in FIGS. 3(A) and 3(B) are indicated by the same reference numerals. In FIG. 6, a cementing non-magnetic material such as glass used for securing two half-core blocks to each other is omitted from the illustration. The illustration includes a boundary face S11 between a magnetic alloy film 2 and a part of a ferrite block 1 within a winding window 9; a recording medium sliding face S12; and boundary faces S13 and S13' between magnetic alloy films 2 and 2' and parts of ferrite blocks 1 and 1' located within flutes 15 and 15' which define a track width. The features of the arrangement of this embodiment are as follows:

The boundary face S11 is not in parallel to a plane forming a magnetic gap part 3 and is arranged to intersect the sliding face S12 to form a straight line L1. This arrangement serves to lessen the contour effect due to the presence of the boundary face S11. Further, the magnetic alloy film existing at the boundary faces S13 and S13' shows also on the sliding face S12 to form boundary lines L2 and L2'. The presence of these boundary lines L2 and L2' prevents the occurrence of even a slight degree of the contour effect due to the presence of a boundary line L3 resulting from a boundary face which is between the ferrite block 1' and the magnetic alloy film 2' applied to the half-core part having no winding window and is exposed on the sliding face S12 in parallel to the gap.

Heretofore, if the boundary lines L1 and L3 between the ferrite block parts 1 and 1' and the magnetic alloy film parts 2 and 2' are in parallel to the gap part on the sliding face S12, the electro-magnetic conversion characteristic has been deteriorated due to the contour effect as mentioned in the foregoing. In accordance with the arrangement of this embodiment, however, this deterioration can be sufficiently lessened. This feature of the embodiment that the boundary lines L1 and L3 can be arranged to be in parallel to the gap enhances the productivity and permits reduction in cost in the same manner as in the case of the magnetic head of FIG. 3(A). Besides, this feature of the embodiment enables the track width to be set as desired and facilitates the manufacture of a head of a large track width.

Figure 7A:
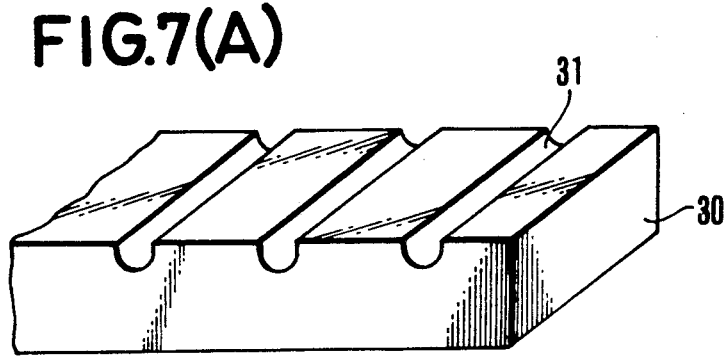
FIGS. 7(A) to 7(G) show processes to be carried out in manufacturing the magnetic head shown in FIG. 6.
Figure 7B:
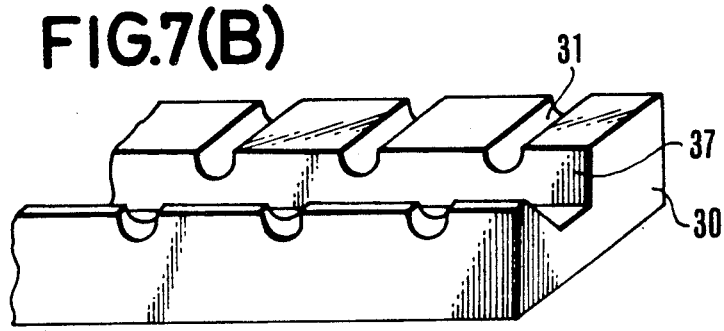
Figure 7C:
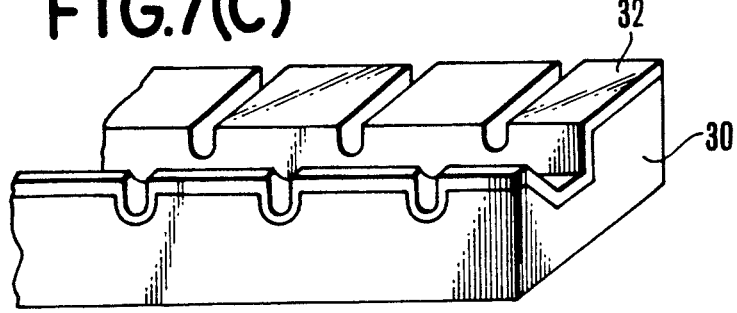
Figure 7D:
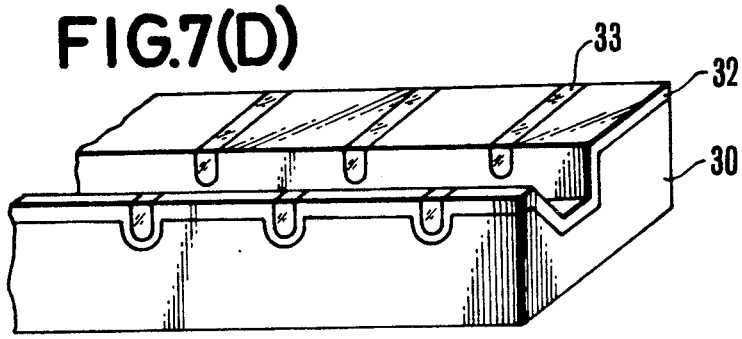

Referring to FIGS. 7(A) to 7(G), the head of FIG. 6 is manufactured as follows: As shown in FIG. 7(A), a ferrite block 30 is first cut and ground to form grooves or flutes 31 by means of rotary grinders or the like which are spaced at a given pitch. Next, a winding groove 37 is formed as shown in FIG. 7(B) in the ferrite block 30 which is provided with the flutes 31. After that, the block 30 is coated with a magnetic alloy film 32 as shown in FIG. 7(C) by sputtering or the like. The flutes 31 which are in a rectangular shape and have their side and bottom faces coated with the magnetic alloy film 32 are filled with a molten glass material 33 of a high fusing point as shown in FIG. 7(D).

Figure 7E:
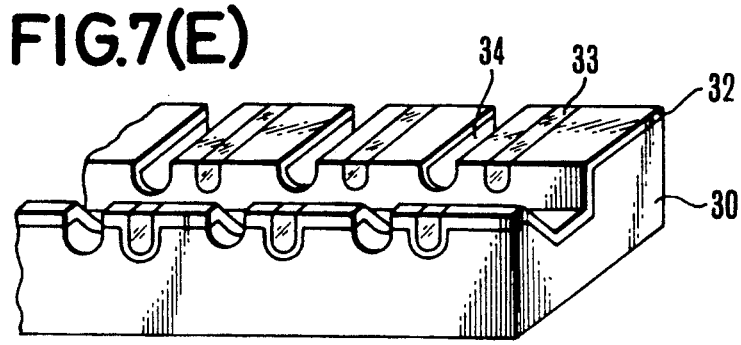
Figure 7F:
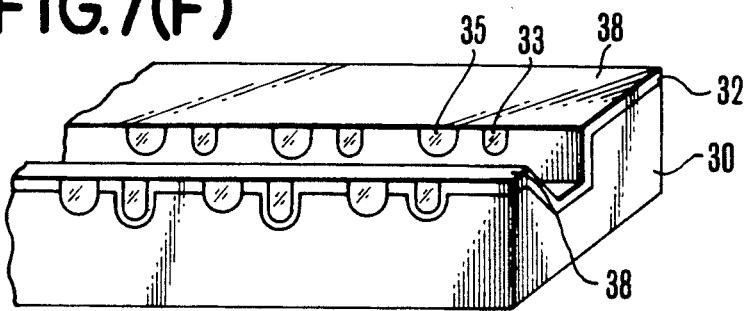
Figure 7G:
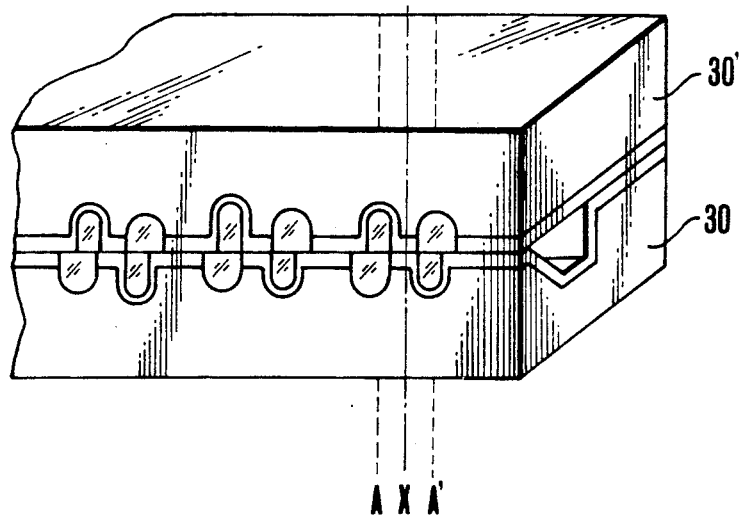

Similar flutes 34 are formed in positions a given distance away from the flutes 31 in a manner as shown in FIG. 7(E). The insides of the flues 34 are filled with a non-magnetic material 35 which is a glass material or the like of a high fusing point. Then, as shown in FIG. 7(F), a magnetic gap material 38 is applied to the block 30. A similar block 30' which is not provided with any winding groove is butted on the block 30 of FIG. 7(F) and the two blocks are joined together by means of a glass material or the like of a low fusing point. After that, a head core chip is obtained by cutting the cemented blocks along broken lines A and A' as indicated in FIG. 7(G).

Following that, the sliding face is polished. The sectional view of FIG. 4(E) is taken along a one-dot chain line X of FIG. 7(G). The above stated sliding face polishing includes the face Σ1 as indicated in FIG. 4(E).

Figure 8A:
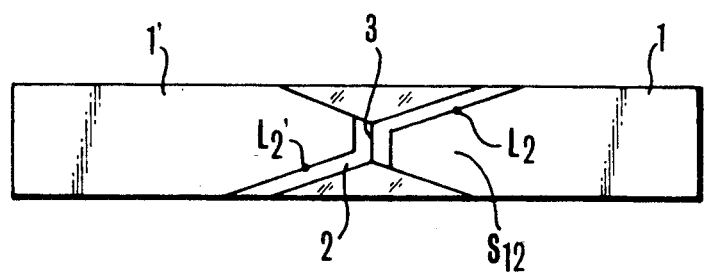
FIGS. 8(A) and 8(B) show examples of modification of the structural arrangement of the magnetic head shown in FIG. 6.
Figure 8B:
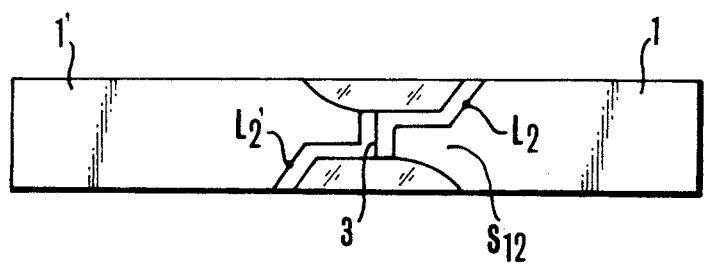

FIGS. 8(A) and 8(B) show modification examples wherein the shapes of the magnetic alloy films 2 and 2' as appearing on the medium sliding face are changed to different shapes. In FIGS. 8(A) and 8(B), the parts which are similar to those shown in FIG. 6 are indicated by the same reference numerals. These modifications can be made by changing the shape of the flutes 31 which are formed by the process of FIG. 7(A). In the cases of FIGS. 8(A) and 8(B), boundary lines L2 and L2' are arranged to be straight lines for the purpose of simplifying the machining work on the ferrite block. However, in the case of FIG. 8(A), the precision of the track width depends on the depth of the flute formed by the process of FIG. 7(A). The flute forming process, therefore, must be carried out at a high degree of precision. Further, the advantages of these examples are similar to those of the embodiment shown in FIG. 6.

Figure 9:
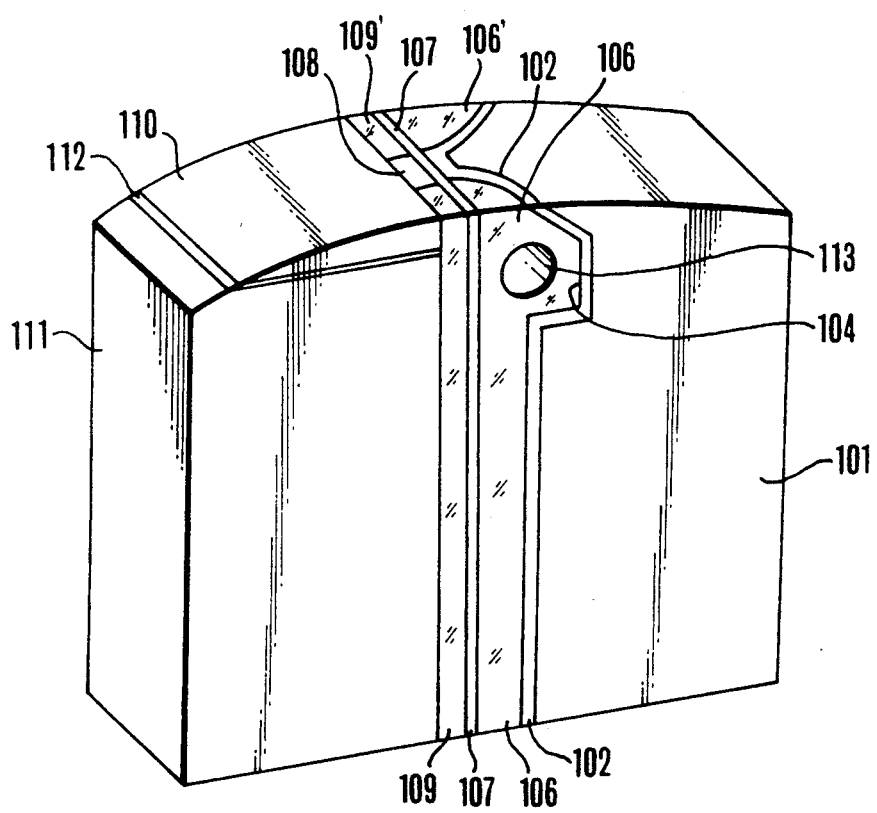
FIG. 9 shows the structural arrangement of a magnetic head arranged as a further embodiment of this invention.

A further example of embodiment is arranged to obviate the process of butting the half core blocks to each other. FIG. 9 shows that embodiment in an oblique view. Referring to FIG. 9, a high permeability block 101 is made of a single crystal ferrite or the like. A magnetic alloy film 102 which has a high saturation flux density is applied to the surface of the high permeability block 101 with a high saturation flux density material such as permalloy, Sendust or an amorphous material physically deposited on the block 101 by sputtering or the like. A magnetic gap material 107 such as $SiO_2$ is applied to the surface of the magnetic alloy film 102 in the form of a film also by sputtering or the like. A second magnetic alloy film 108 is applied further to the surface of the gap material 107 also in the form of a film by sputtering or the like. The illustration includes a winding window forming groove 104; low-fusing-point glass parts 106 and 106'; low-fusing-point glass parts 109 and 109' having a low fusing point which is about the same as or lower than that of the glass parts 106 and 106'; and protector plates 110 to 112. The protector plate 110 is made of a non-magnetic, high abrasion resistance material such as a non-magnetic ferrite or single crystal glass material. The protector plate 111 is a high permeability block which is made of, for example, a single crystal ferrite material. The protector plate 112 is an adhesive having a fusing point which is about the same as or higher than that of the low-fusing-point glass parts 109 and 109'. A reference numeral 113 denotes a winding window. The features of this embodiment in terms of the manufacturing processes and structural arrangement are as follows' The essential function of pole - gap -pole which is a basic structural requirement is satisfied by the films formed one on top of another on the high permeability block 101 including the magnetic alloy film 102 which serves as a first magnetic pole, the gap material 107 and the magnetic alloy film 108 which serves as a second magnetic pole. On the sliding face of the head, a boundary between the high permeability block 101 and the magnetic alloy film 102 is arranged in parallel to the gap material 107. However, with the thickness of the first magnetic alloy film 102 arranged to graduate in the direction of the depth of the gap as mentioned in the foregoing, it has been ascertained through experiments that the contour effect can be suppressed to a negligible degree.

Further, the arrangement of the magnetic alloy film 102 to extend from both ends of the gap material part 107 along the boundary between the high permeability block 101 and the low-fosing-point glass parts 106 and 106' further suppresses the contour effect.

Figure 10A:
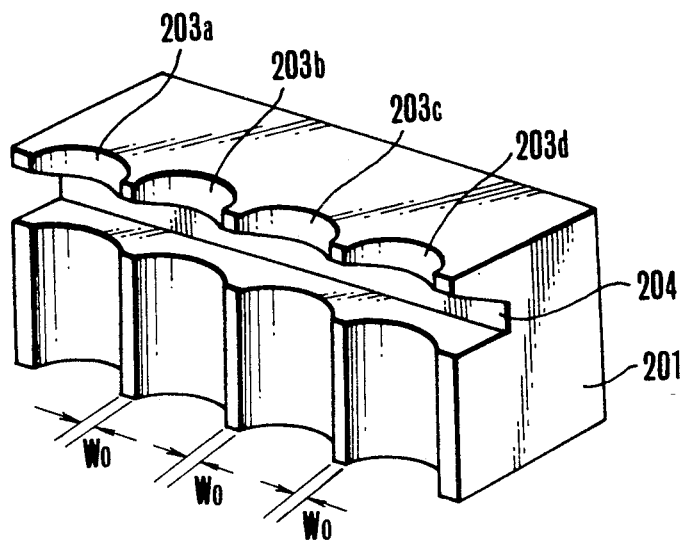
FIGS. 10(A) to 10(G) show processes to be carried out in manufacturing the magnetic head shown in FIG. 9.

The head which has the above stated structural features is manufactured in the following manner: FIGS. 10(A) to 10(G) show the manufacturing processes. Referring to FIG. 10(A), a rectangular block 201 is made of a single crystal ferrite material. Many flutes or grooves 203a to 203d are fluted in one side of the rectangular block 201 in parallel to each other. In this instance, the fore end side faces of the grooves are preferably arranged not in parallel to each other, because: The magnetic alloy film 202 cannot be easily applied to the side faces if they are in parallel during the ensuing process of coating them with the film and, even if the film can be formed there under such a condition, the magnetic property of the head would be degraded thereby.

In this case, width Wo between the parallel grooves is formed to be narrower than the track width which will be formed later. A second groove 204 is also formed at the same time for obtaining a winding window 113.

Figure 10B:
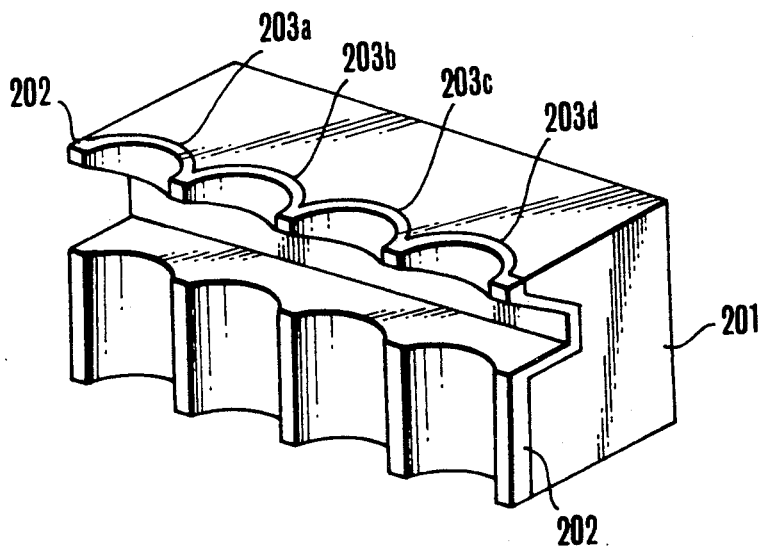
Figure 10C:
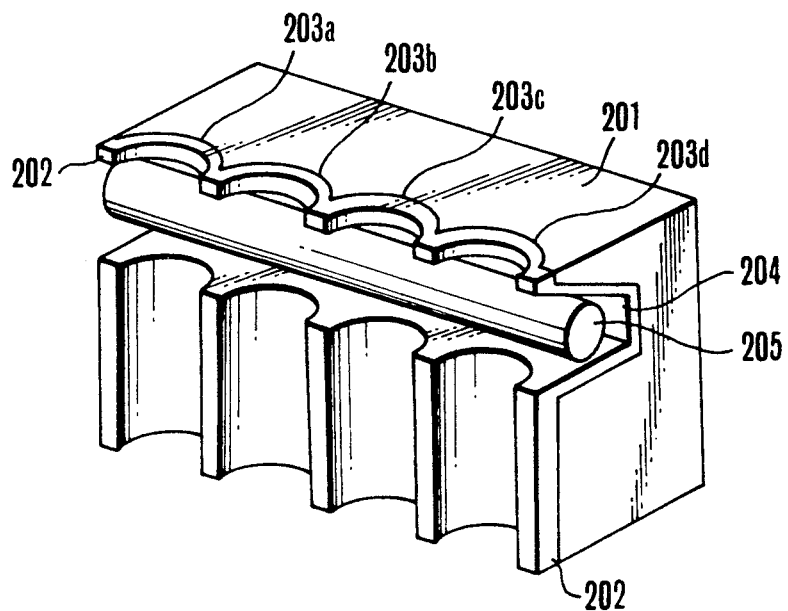
Figure 10D:
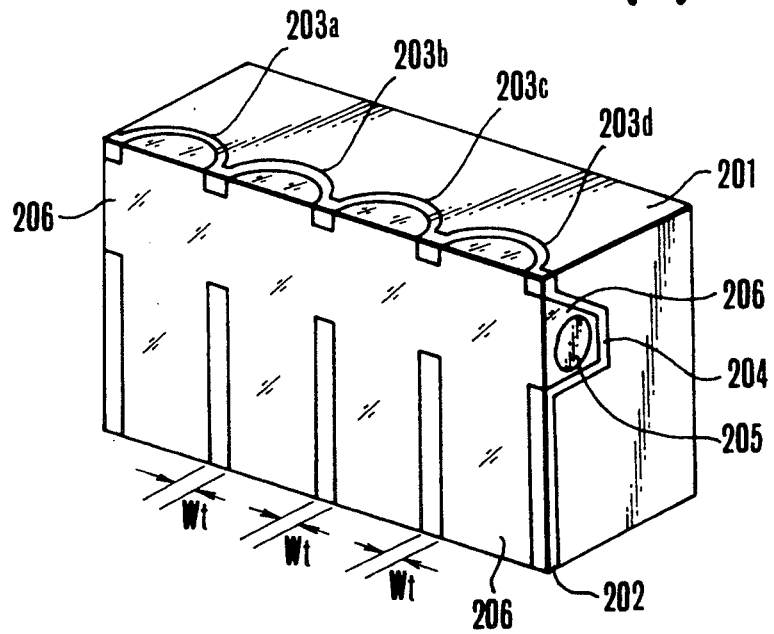
Figure 10E:
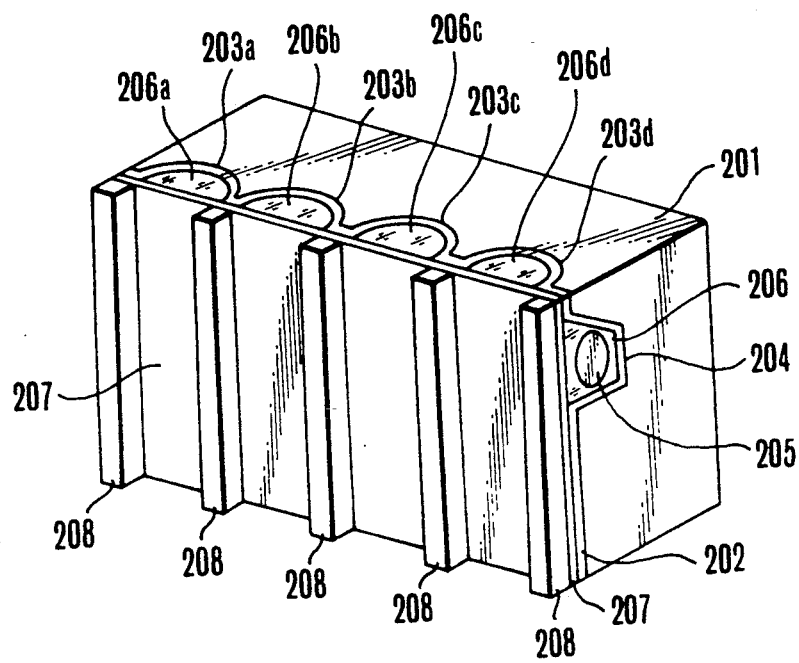
Figure 10F:
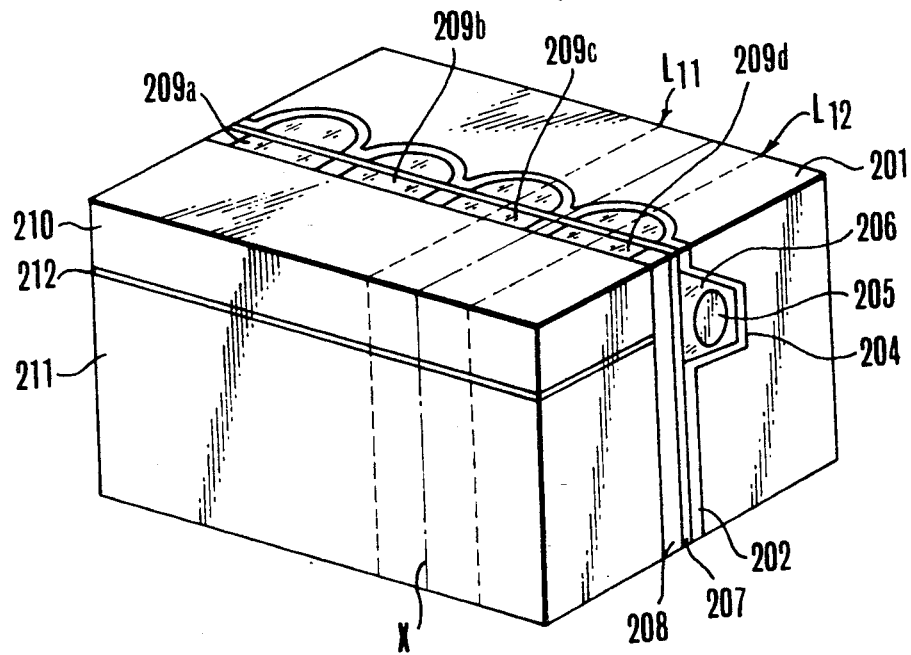

In the next manufacturing process which is as shown in FIG. 10(B), one side of the ferrite block 201 which is provided with the above stated grooves is coated with a magnetic alloy film 202 to a film thickness between 30 and 50 μm or thereabout by a physical deposition, plating or CVD process. The coating film thickness is determined considering the width Wo shown in FIG. 10(A), a necessary track width and allowance for grinding and in such a way as to have a thickness of at least 20 μm in the vicinity of the gap. After completion of coating with the magnetic alloy film 202, a metal bar 205 which is made of aluminum or the like is inserted into the groove 204 as shown in FIG. 10(C). Then, the first grooves 203a to 203d and the second groove 204 are all filled with a first low-fusing-point glass 206 with the metal bar 205 buried thereby in the second groove 204. The first low-fusing point glass 206 is of a fusing point between 550° and 600° C. or thereabout. FIG. 10(D) shows the block as in the state of having been filled with the first low-fusing-point glass 206 and having been smoothly lapped to form a gap plane. A width Wt is then adjusted to a desired track width. After smooth lapping, a magnetic gap material 207 which is $SiO_2$ or the like is applied to the lapped side to a thickness of, say, 0.2 to 0.3 μm according to the design as shown in FIG. 10(E). Then, a second magnetic alloy film 208 which serves as another magnetic pole is applied to the gap material to a thickness of, say, 20 to 50 μm. In this instance, it is necessary that the magnetic alloy film is left only where it is required. Conceivable processes for this purpose include photo-lithography, machining with a die-sinking machine, etc. In FIG. 10(F), a protector block (210 to 212) which is discretely prepared is shown as in a state of having been welded by means of a second low-fusing-point glass parts 209a to 209d which are of a fusing point between 500° and 550° C. or thereabout.

The upper sliding face part 210 of the protector block is made of a non-magnetic material while the lower part 211 of the block is made of a high permeability material such as a single crystal ferrite. These two protector members 210 and 211 are cemented together by an adhesive 212 which is a third low-fusing-point glass having a fusing point between 550° and 600° C. or thereabout.

A head chip is cut out from this core block along lines L11 and L12 as indicated in FIG. 10(F). The metal bar which is buried in the winding window forming groove 204 is melted and removed by soaking the chip in a caustic soda solution, or by a like process, to obtain a winding window 204. The appearance of the head chip which is obtained through a further process on its outside parts such as the sliding face, etc. is as shown in FIG. 9.

Figure 10G:
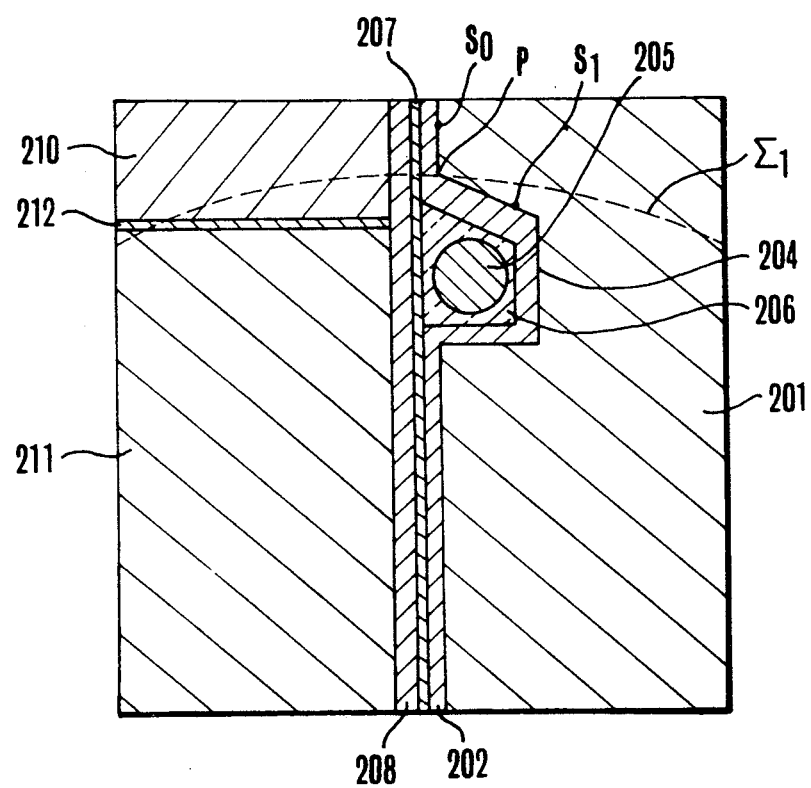

The above stated process on the outside parts of the head chip is as follows' FIG. 10(G) is a sectional view taken along a one-dot-chain line X of FIG. 10(F). Referring to FIG. 10(G), an intersection line between a face S0 and the face S1 of the winding window forming groove 204 of the ferrite block 201 is indicated by a point P. In the case of the head of this embodiment, the position of the sliding face in an initial state is either arranged to be at the point P or below the point P.

Figure 11:
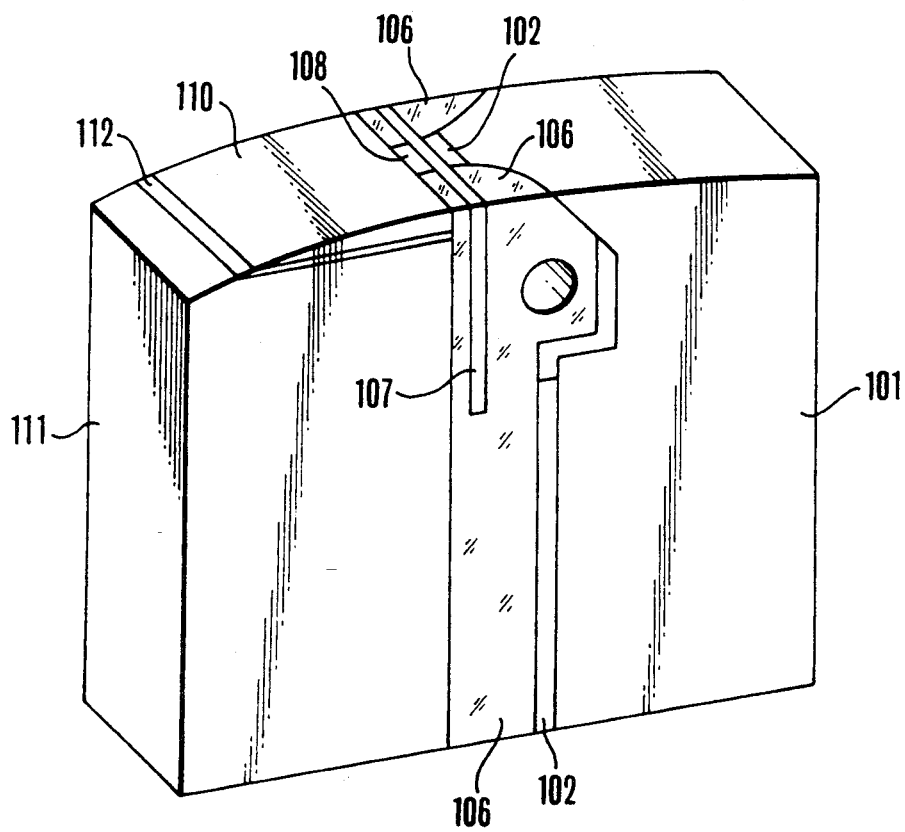
FIG. 11 shows the structural arrangement of a magnetic head arranged as a further embodiment of this invention.

FIG. 11 shows in an oblique view a head arranged as a further embodiment of this invention. The structural arrangement of this embodiment partly differs from that of the embodiment shown in FIG. 9. Unlike the head chip of FIG. 9, the magnetic alloy film 102 of the head chip of FIG. 11 does not extend along a boundary between the high permeability block 101 and the low-fusing-point glass part 106. Further, the gap material 107 is formed in such a way that it does not extend to the lower core side. Therefore, at least a portion of the first magnetic alloy film 102 and the second magnetic alloy film 108 are in contact directly with each other on the lower core side.

Compared with the magnetic head of FIG. 9, the coating film 202 of the magnetic head of FIG. 11 has a smaller internal stress after the head is coated therewith. Although the magnetic alloy film 202 does not extend along the above stated boundary, the ripple in the output characteristic due to the contour effect can be kept below 1 dB which is a negligible value for actual applications. Further, it is another advantage of the embodiment that the reluctance of the low core part is lowered.

Figure 12:
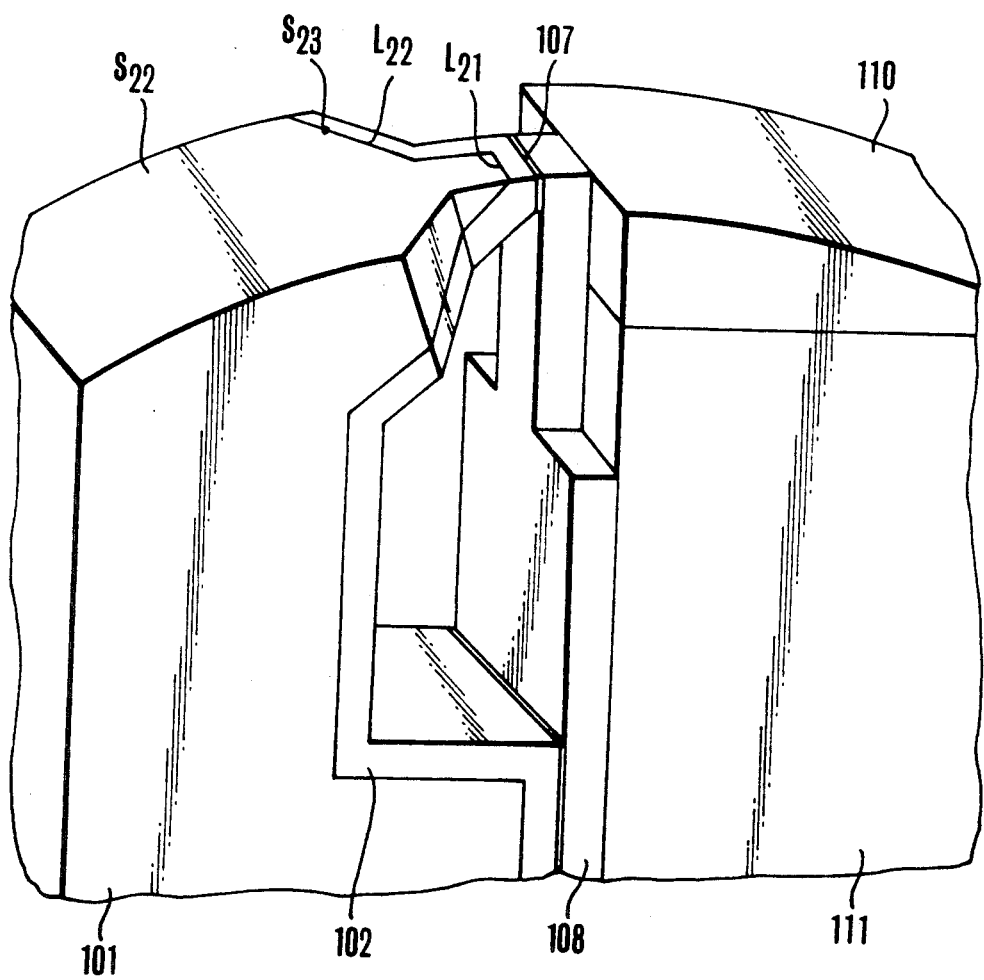
FIG. 12 shows the structural arrangement of a magnetic head arranged as a still further embodiment of this invention.
Figure 13A:
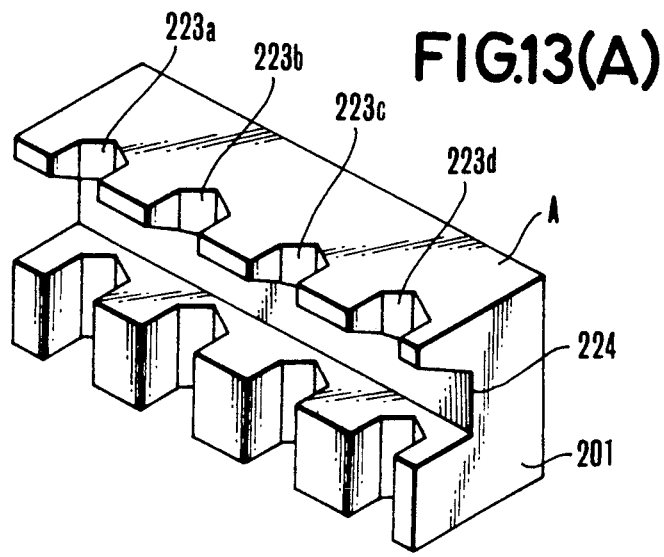
FIGS. 13(A) to 13(F) show processes for manufacturing the magnetic head shown in FIG. 12.
Figure 13B:
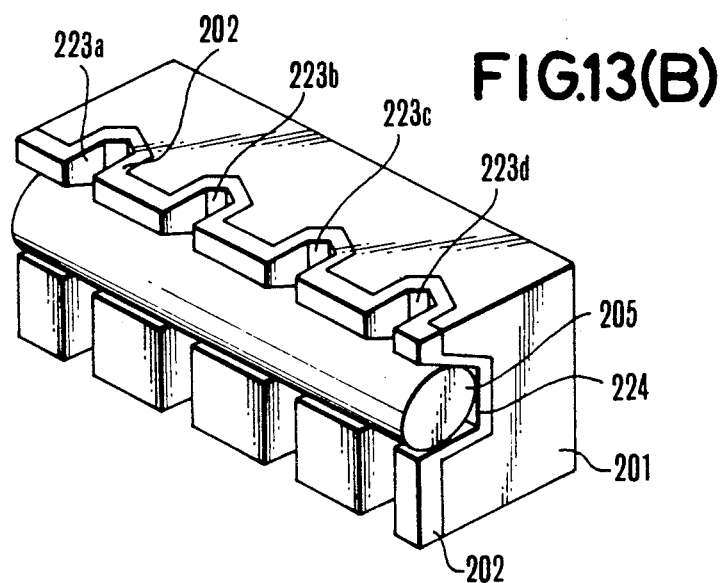
Figure 13C:
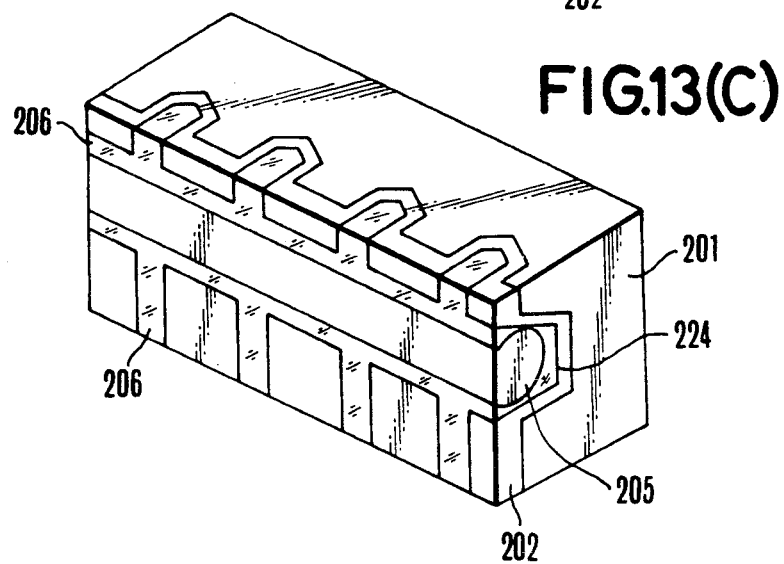
Figure 13D:
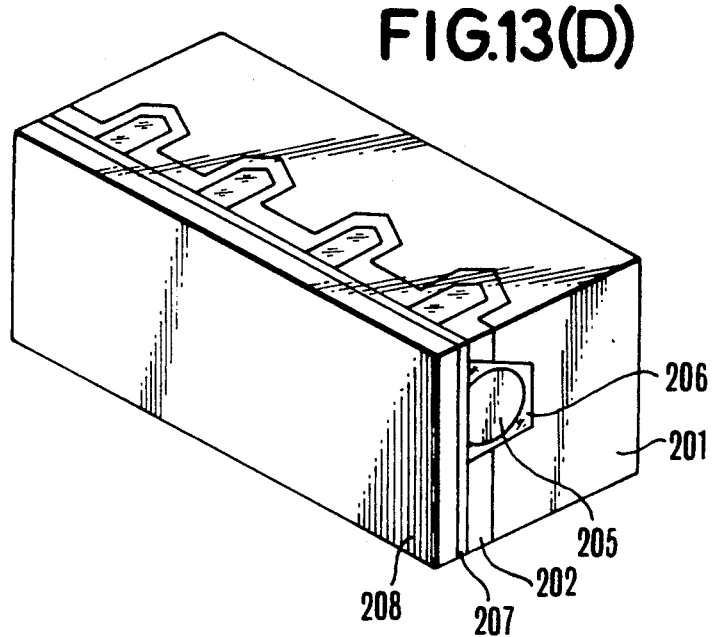
Figure 13E:
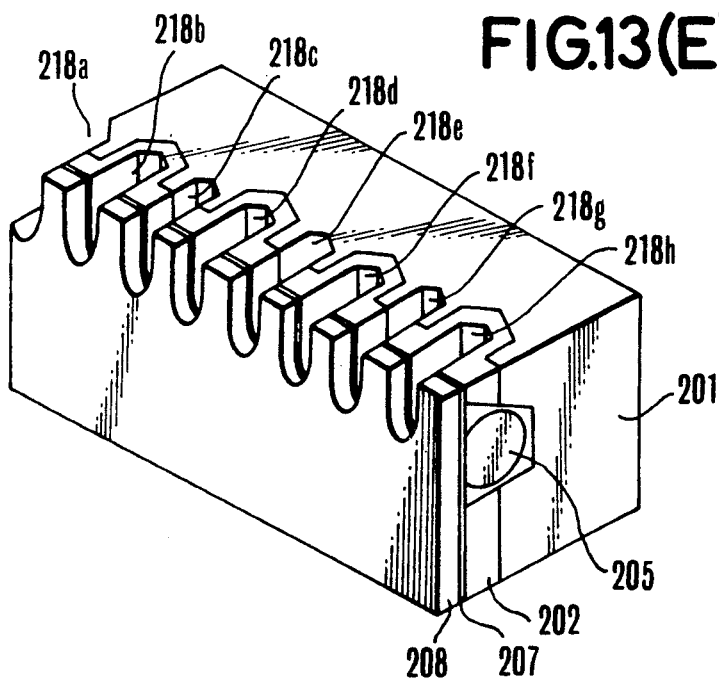
Figure 13F:
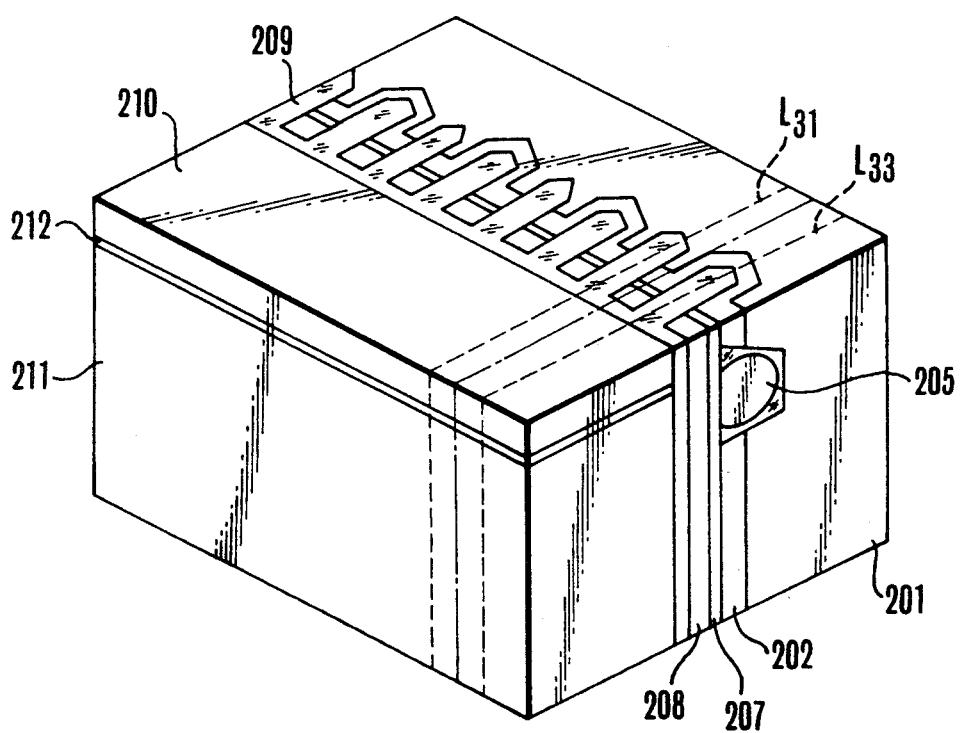

FIG. 12 shows the structural arrangement around the electro-magnetic conversion part of a magnetic head which is arranged as a further embodiment of the invention. The parts similar to those of FIG. 9 are indicated by the same reference numerals and the details of them are omitted from the following description. Further, FIG. 12 omits the glass parts to be used for cementing and the winding. The illustration includes a boundary face S21 between a magnetic alloy film 102 and a high permeability block 101; a medium sliding face S22; a boundary face S23 between the side wall face of a groove formed in the high permeability block 101 for defining the track width and a magnetic alloy film 102; an intersection line L21 between the faces S21 and S22; and an intersection line L22 between the faces S23 and S22. In the case of FIG. 12, the face S21 on which the magnetic alloy film 12 is applied to a half core part having a winding window is not in parallel with a magnetic gap forming face and intersects, in that state, the medium sliding face S22 to form the intersection line L21. The arrangement is such that the magnetic alloy film portion on the face S21 is alone used while the portion on a face which is in parallel to the surface of the magnetic alloy film 108 is arranged to disappear when the face S22 is formed. The contour effect thus can be lessened to a great degree by virtue of this arrangement. Further, the magnetic alloy film which is applied to the track width defining face S23 appears also on the face S22 to form the intersection line L22 between the face S22 and the face S23. That arrangement further suppresses even a small degree of the contour effect which arises at the intersection line L21, so that any writing ability fluctuations due to variations in the thickness of the magnetic alloy film in the vicinity of the gap can be eliminated. The arrangement of this embodiment thus not only suppresses the contour effect but also enhances the writing capability of the head. The head which has the above stated structural advantages is manufactured as described below with reference to FIGS. 13(A) to 13(E):

Referring to FIG. 13(A), a rectangular block 201 made of single crystal ferrite has many parallel flutes 223a to 223d and a winding window forming groove 224 formed in one side face thereof. A magnetic alloy film 202 of a thickness of 10 to 50 μm or thereabout is applied to the fluted and grooved side face in a manner as shown in FIG. 13(B) by a physical deposition, plating or CVD method or the like. In case that the block 201 is made of a single crystal ferrite material, one side face A shown in FIG. 13(A) represents the surface of crystal orientation. The use of this side as the medium sliding face is preferable in terms of abrasion resistance. In case that Sendust is used for the magnetic alloy film 202, the development of the internal stress can be lessened by arranging the surface of the film 202 either to be in parallel to the surface of the ferrite block 201 or to be in a slightly convexed shape. After the film is applied, a metal bar 205 which is made of a material selected from a group consisting of aluminum, copper, nickel, zinc, iron, etc. is inserted into the groove 224 and is buried in the groove when the flutes and the groove are filled with a first low-fusing-point glass material 206 of a fusing point between 550° and 600° C. as shown in FIG. 13(B). In the manufacturing step shown in FIG. 13(C), after the groove and flutes are filled with the low-fusing-point glass 206, the surface of this side face is smoothly lapped to form a gap face. After lapping, a gap material 207 which is $SiO_2$ or the like is applied to a prescribed thickness of, say, 0.2 to 0.3 μm and then, for the purpose of forming the other magnetic pole, a second magnetic alloy film 208 is applied to a thickness of, say, 10 to 50 μm in a manner as shown in FIG. 13(D). In this instance, the thickness of the magnetic alloy film 208 is preferably arranged to be not equal to the thickness of the first magnetic alloy film 202 obtained after lapping. FIG. 13(E) shows the flutes 218a to 218h as in a state of having been processed to define the track width in the vicinity of the gap. Track defining parts in between the flutes are nearly in parallel to each other. In cases where there is some difficulty in obtaining perfectly tight cohesion, etc. among the three layers of films 202, 207 and 208 and the ferrite block 201 and thus it is difficult to finish the flutes 218a to 218h through one processing step, the flute which is defining the right-hand side of the (recording) track and the flute defining the left-hand side of the track are separately processed through two processing steps. Further, in filling the flutes and groove with the low-fusing-point glass, a thin film of a metal or metal oxide such as Cr, $CrO_3$, or the like is preferably applied beforehand to the surface of the magnetic alloy film appearing on the surfaces of the flutes and groove for the purpose of preventing a reaction between the magnetic alloy film and the low-fusing-point glass. FIG. 13(F) shows the process wherein: With the track width defining flutes 218a to 218h utilized, a protector block 210 and 211 which has been discretely prepared is welded to the block 201 by means of a low-fusing-point glass material 212. The upper part 210 of the protector block which is on the side of the sliding face is made of a non-magnetic material while the lower part 211 is made of a high permeability material such as single crystal ferrite. The two protector block members 210 and 211 are cemented by an adhesive 212 which is a low-fusing-point glass or the like of a fusing point between 550° and 600° C. or thereabout. A head core chip is cut out from this core block along broken lines L31 and L33 as shown in FIG. 13(F). The chip is soaked in an alkali solution such as a caustic soda solution to obtain a winding window causing the metal bar 205 to be melted and removed from the winding window forming groove. The essential parts of the head chip which has its medium sliding face, etc. duly processed are as shown in FIG. 12. A sectional view taken along a center line (a one-dot chain line) of FIG. 13(F) would be similar to FIG. 10(G). Further, the medium sliding face is processed and obtained also in the same manner as in the case of FIG. 10(G).

Figure 14A:
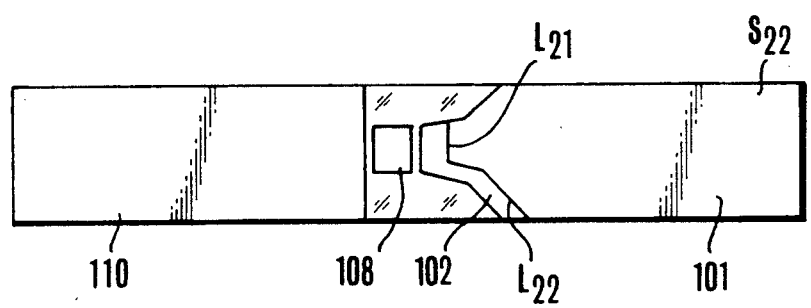
FIGS. 14(A) and 14(B) show examples of modification of the structural arrangement of the magnetic head of FIG. 12.
Figure 14B:
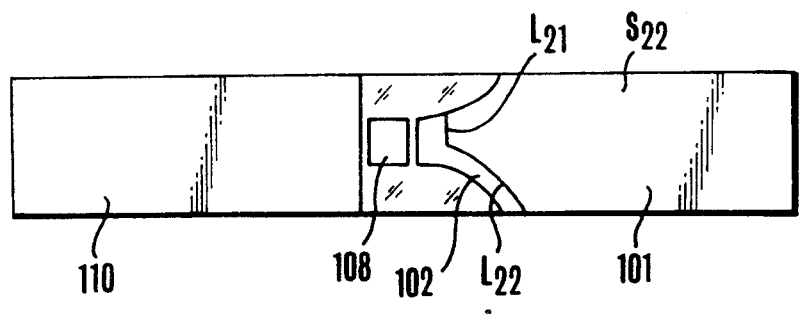

FIGS. 14(A) and 14(B) show by way of example the medium sliding faces which are arranged in different manners from the arrangement of FIG. 12. These sliding face arrangements make the flow of the magnetic flux smoother than the arrangement of FIG. 12. In the case of FIG. 14(A), however, the track width tends to vary depending on the degree of grinding work on the gap face during the gap face forming process which is performed as shown in FIG. 13(C). This problem is solved by the arrangement of FIG. 14(B), wherein the intersection line L22 is changed to be in an arcuate shape. With the line L22 changed in that way, the track width is not affected by the fluctuating degree of grinding work performed during the manufacturing process shown in FIG. 13(C). Therefore, the precision of the track width can be increased by the arrangement of FIG. 14(B).

What is claimed is:

1. A magnetic head having a recording medium sliding surface, comprising:
   (a) a first half core including a magnetic oxide material part and a thin magnetic metal film deposited on said magnetic oxide material part;
   (b) a non-magnetic layer which is arranged to be in contact with said thin magnetic metal film and to have a gap part thereof serve as a magnetic gap; and
   (c) a second half core opposed to said first half core through said non-magnetic layer, the thickness of said thin magnetic metal film being arranged to continuously increase at about a constant rate as it extends away from said sliding surface at the gap part of said non-magnetic layer.

2. A head according to claim 1, wherein said second half core consists of a magnetic oxide material and a thin magnetic metal film which is deposited on said magnetic oxide material.

3. A head according to claim 1, wherien said first core includes a winding groove for a winding; and a slanting surface which is located between said winding groove and said recording medium sliding surface and is slantingly opposed to the gap part of said non-magnetic layer, said thin magnetic metal film being deposited on said slanting surface.

4. A head according to claim 1, wherein, on said recording medium sliding surface, at least a portion of a boundary line between said magnetic oxide material and said thin magnetic metal film is arranged to be in parallel to said non-magnetic layer.

5. A head according to claim 1, wherein said first half core is provided with a winding groove for a winding and has said thin magnetic metal film deposited also on inner surfaces of said winding groove.

6. A head according to claim 5, wherein one of said inner surfaces of said winding groove on the side of said recording medium sliding surface of the head forms a slanting surface slanting to the gap part of said non-magnetic layer; said slanting surface extends to intersect said recording medium sliding surface; and said thin magnetic metal film is deposited on said slanting surface.

7. A head according to claim 1, further comprising a pair of non-magnetic parts arranged to form non-magnetic areas at two ends of a line which represents said non-magnetic layer on said recording medium sliding surface.

8. A head according to claim 7, wherein said thin magnetic metal film exists on said recording medium sliding surface along a boundary between said magnetic oxide material and one of said pair of non-magnetic parts.

9. A magnetic head having a recording medium sliding surface, comprising:
   (a) a magnetic oxide block which has a slanting surface starting at the recording medium sliding surface;
   (b) a first thin magnetic metal film accumulated on said slanting surface, the first thin magnetic metal film having a thickness arranged to continuously increase at about a constatn rate as it extends away from said sliding surface;
   (c) a non-magnetic film which is accumulated on said first thin magnetic metal film and has a gap part thereof arranged to form a magnetic gap, said first thin magnetic metal film which is in contact with said gap part of the non-magnetic film being accumulated on said slanting surface of said magnetic oxide block, said slanting surface starting away from said gap part of said non-magnetic film and the recording medium sliding surface; and
   (d) a second thin magnetic metal film which is accumulated on said gap part of said non-magnetic film.

10. A head according to claim 9, wherein a winding groove for a winding is formed in said magnetic oxide block and said slanting face forms one of inner faces of said winding groove.

11. A head according to claim 9, further comprising: a reinforcing member cemented to said second thin magnetic metal film.

12. A head according to claim 11, wherein a part of said reinforcing member located on the side of said recording medium sliding face is made of a non-magnetic material while a part of said reinforcing member on the side opposite to said sliding face is made of a magnetic oxide material.

* * * * *